(12) United States Patent
Contractor et al.

(10) Patent No.: US 8,482,562 B2
(45) Date of Patent: Jul. 9, 2013

(54) VISION-BASED COMPUTER CONTROL

(75) Inventors: Danish Contractor, Haryana (IN);
Swetha Prasad, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 12/630,635

(22) Filed: Dec. 3, 2009

(65) Prior Publication Data

US 2011/0134124 A1 Jun. 9, 2011

(51) Int. Cl.
*G06T 15/00* (2011.01)

(52) U.S. Cl.
USPC ........... 345/428; 345/419; 345/426; 348/164; 348/169; 348/173; 382/118

(58) Field of Classification Search
USPC .................. 345/419, 426, 428; 348/169, 164, 348/173; 382/118, 14.01
See application file for complete search history.

(56) References Cited

U.S. PATENT DOCUMENTS

| | | | |
|---|---|---|---|
| 4,190,332 A | 2/1980 | Body et al. | |
| 5,333,029 A | 7/1994 | Uchiyama et al. | |
| 5,471,542 A | 11/1995 | Ragland | |
| 5,684,561 A | 11/1997 | Yancey | |
| 5,748,382 A | 5/1998 | Maguire, Jr. | |
| 5,796,463 A | 8/1998 | Bullimore | |
| 6,433,759 B1 | 8/2002 | Richardson et al. | |
| 7,091,928 B2 * | 8/2006 | Rajasingham | 345/7 |
| 7,290,879 B2 | 11/2007 | Nagata et al. | |
| 7,360,898 B2 | 4/2008 | Nagata et al. | |
| 7,439,940 B1 | 10/2008 | Maguire, Jr. | |
| 7,460,150 B1 * | 12/2008 | Coughlan et al. | 348/169 |
| 7,706,576 B1 * | 4/2010 | Beck et al. | 382/118 |
| 7,783,077 B2 * | 8/2010 | Miklos et al. | 382/103 |
| 2002/0122014 A1 | 9/2002 | Rajasingham | |
| 2004/0174497 A1 | 9/2004 | Sharma | |
| 2004/0240709 A1 | 12/2004 | Shoemaker | |
| 2007/0008490 A1 | 1/2007 | Nagata et al. | |
| 2007/0279591 A1 | 12/2007 | Wezowski et al. | |
| 2009/0156970 A1 | 6/2009 | Sullivan | |
| 2012/0176383 A1 | 7/2012 | Contractor et al. | |

FOREIGN PATENT DOCUMENTS

| | | |
|---|---|---|
| EP | 1807724 A1 | 7/2007 |
| JP | 2003070740 A | 3/2003 |
| JP | 2008264225 A | 11/2008 |
| WO | 2006036272 A1 | 4/2006 |

OTHER PUBLICATIONS

Manu Kumar, "Gaze-Enhanced User Interface Design," SOUPS (Symposium on Usable Privacy and Security) 2007-http://hci.standford.edu/research/GUIDe/ , http://ilpubs.standford.edu:8090/806/1/2007-20.pdf.

(Continued)

*Primary Examiner* — Phu K Nguyen
(74) *Attorney, Agent, or Firm* — Terry J. Carroll; Edell, Shapiro & Finnan, LLC (57) ABSTRACT

Disclosed herein is a method of controlling a computing device having a display. The method comprises identifying a point on the display at which a user's gaze is directed; determining whether an eye of the user has accommodated toward a near-field refractive state; and increasing, based on the determining, the resolution of a region on the display of the computer system, the region being centered on the identified gaze point.

7 Claims, 6 Drawing Sheets

OTHER PUBLICATIONS

David Fono, "Eye Windows: Evaluation of Eye Controlled Zooming Windows for Focus Selection," Human Media Lab Queen's University Kingston, ON K7L 3N6, Canada, 2005 -http://www.dgp.toronto.edu/papers/dfono_CHI2005.pdf.

Manu Kumar, "Eyepoint: Practical Pointing and Selection Using Gaze and Keyboard," Stanford University, HCI Group 353 Serra Mall, Stanford, CA 94305-9035, CHI 2007, Apr. 28-May 3, 2007, San Jose, California, USA. Copyright 2007 -http://hci.stanford.edu/research/GUIDe/publications/CHI%202007%(paper)%20-%20EyePoint%20Practical%20Pointing%20and%20Selection%20Using%20Gaze%20and%20Keyboard.pdf.

Thomas O Salmon, (Lectures by Dr. Thomas O Salmon) Associate of Professor of Optometry, North Eastern State University, OK, USA :http://arapaho.nsuok.edu/~salmonto/vs3_materials/LectureOM3.pdf.

Elwin Margt, School of Optometry, University of California,Berkeley,CA,USA (American Journal of Optometry and Archives of the American Academy of Optometry, Jul. 1951)—http://brain.berkeley.edu/pub/1951%20Jan%20An%20Investigation%20of%20Voluntary.pdf.

Joshua Ben-Nun "Overview of the NuLens Accommodating IOL" (IntraOccular Lens)- © 2009 by Bryn Mawr Communications LLC.—Jan./Feb. 2008 I Cataract & Refractive Surgery Today Europe I 21—http://www.crstodayeurope.com/Pages/whichArtide.php?id=293.

Konrad Pesudovs "A Comparison of Autorefractor Performance", PhDDepartment of Ophthalmology, Flinders Medical Centre, Flinders University, Bedford Park, South Australia, Australia, 1040-5488/04/8107-0554/0 vol. 81, No. 7, pp. 554-558Optometry and Vision Science.

"ARK-530A Specifications"—http://www.marco.com/automated/ark530a_specs.pdf—The ARK-530A is manufactured by Nidek.

Jonathan David Pfautz , "Depth perception in computer graphics"—http://www.cl.cam.ac.uk/techreports/UCAM-CL-TR-546.pdf.

Jochen Heinzmann, Er Zelinsky , 3-D facial pose and gaze point estimation using a robust real-time tracking paradigm (1998 ), Proceedings of the IEEE International Conference on Automatic Face and Gesture Recognition.

Physorg.com: Pupil Dilation marks decision making http://www.physorg.com/news122135268.html Feb. 13, 2008.

Kyung-Nam Kim* and R. S. Ramakrishna, Vision-Based Eye-Gaze Tracking for Human Computer Interface , 1999IEEE—"www.umiacs.umd.edu/~knkim/paper/ieee_smc99_hci-eyegaze.pdf".

http://www.psychol.ucl.ac.uk/alan.johnston/Depth.html.—Anderson, B.L. and Nakayama, K. (1994) Towards a general theory of stereopsis: binocular matching, occluding contours and fusion. Psych. Rev., 101, 414-445; Bruce, V., Green, P.R. & Georgeson, M.A. (1996) Visual Perception: Physiology, Psychology and Ecology 3rd Ed. Psychology Press, Hove.

M. Bailey "Quantifying the Relative Roles of Shadows, Stereopsis, and Focal Accommodation in 3D Visualization" (USA) Visualization, Imaging, and Image Processing—2003.

International Search Report and Written Opinion dated Jan. 31, 2011 cited in Application No. PCT/EP2010/066388.

"RS232C Connect VB6 or VBA (repost)"—Copyright © 2000-2008 Acumen Instruments Corporation- http:// softmarket.ro/freelance-jobs/auction_details/518368/rs232c-connect-vb6-or-vba-repost.html.

Elise Harb et al., "Characteristics of Accomadative Behavior During Sustained Reading in Emmetropes and Myopes", Elsevier Ltd.; Mar. 20, 2006.

Asahina Shigetoshi et al., "Development of Monitoring System for Pupil Activity, Eye Movement and Lens Accomodation", vol. 100, No. 489; 2000.

Jay Warshawsky, "High-Resolution Optometer for the Continuous Measurement of Accommodation", JOSA, vol. 54, Issue 3, pp. 375-375; 1964.

Henry C. Angell, M.D., "How to Take Care of Our Eyes: With Advice to Parents and Teachers in Regard to the Management of the Eyes of Children", Boston: Roberts Brothers, 1878.

Henry W. Hofstetter et al., "Dictionary of Visual Science and Related Clinical Terms", Fifth Edition, Journal of the Optical Society of America, vol. 54, No. 3, pp. 375-379.

Davson et al., "Human Eye", Britannica Online Encyclopedia, 2007.

Michael Kent, "Advanced Biology" Oxford University Press, (2000), 6 pages.

Takeda et al., "Dynamic Accommodation Revealed by Three Dimensional Optometer and its Control Center in a Brain", Proceedings—19th International Conference—IEEE/EMBS Oct. 30-Nov. 2, 1997, pp. 2782-2787.

"Refraction and Ray Model of Light- Lesson 6", http://www.physicsclassroom.com/class/refrn/u1416c.cfm, retrieved from the internet on Oct. 10, 2011, 2 pages.

"Accommodation reflex", http://en.wikipedia.org/wiki/Acommodation_reflex, retrieved from the internet on Oct. 10, 2011, 2 pages.

Shukla et al., "New Age Practical Physics", Section 2.11 and 2.12, First Edition 2006, pp. 32-33.

\* cited by examiner

VISION-BASED COMPUTER CONTROL

BACKGROUND

Computing devices are ubiquitous in modern society. The means by which a human user is to control the computing device is such an important design issue that an entire field of research—that of human-computer interfaces or HCIs—has arisen to provide alternatives. Conventional HCIs use manual input via such devices as keyboards, keypads, mice, touchscreens, joysticks, and the like. However, such manual HCIs are difficult or impossible for people with certain physical disabilities such as motor disorders and paralysis to use effectively. Furthermore, manual HCIs are not well suited for use by users who have their hands occupied with other tasks such as piloting vehicles.

For these reasons, non-manual HCIs have been developed. One emerging category of non-manual HCIs is vision-based controllers. Vision-based controllers typically monitor the eye of the user to track the user's gaze direction and use the resulting coordinate information to control the behavior of the computing device, e.g. for pointing and selection, application switching, password entry, or document navigation. Vision-based HCIs can be designed to replace or be complementary to conventional manual HCIs. Being based on a two-dimensional coordinate location, current vision-based HCIs are well suited to control tasks with a simple two-dimensional movement analogue, such as moving pointers. However, they are not so well-suited to other control tasks that do not have a simple two-dimensional movement analogue, such as controlling the resolution of a visual display of data. Such tasks are typically implemented using dedicated on-screen controls that are manipulable by vision-based control or other means.

SUMMARY

According to a first aspect of the present invention, there is provided a method of controlling a computing device having a display. The method comprises identifying a point on the display at which the gaze of a user of the computing device is directed; determining whether an eye of the user has accommodated toward a near-field refractive state; and increasing, based on the determining, the resolution of a region on the display of the computer system, the region being dependent on the identified gaze point.

According to a second aspect of the present invention, there is provided a system for controlling a computing device having a display. The system comprises a vision monitoring system and a control process adapted to be executed by a processor of the computing device. The vision monitoring system comprises an auto-refractor measurement apparatus adapted to provide data indicating a refractive state of an eye of a user of the computing device; and a gaze point tracker adapted to provide data indicating a point on the display at which the user's gaze is directed. The control process comprises an analyze-and-adjust subprocess adapted to analyze the gaze point data and the refractive-state data and adjust one or more display parameters dependent on the analysis; and a display subprocess adapted to display a data set on the display dependent on the display parameters.

According to another aspect of the present invention, there is provided a computer program product including a computer readable medium having recorded thereon a computer program for implementing the method described above.

Other aspects of the invention are also disclosed.

BRIEF DESCRIPTION OF THE DRAWINGS

One or more embodiments of the invention will now be described with reference to the drawings, in which.

DETAILED DESCRIPTION

Where reference is made in any one or more of the accompanying drawings to steps and/or features, which have the same reference numerals, those steps and/or features have for the purposes of this description the same function(s) or operation(s), unless the contrary intention appears.

Figure 1A:
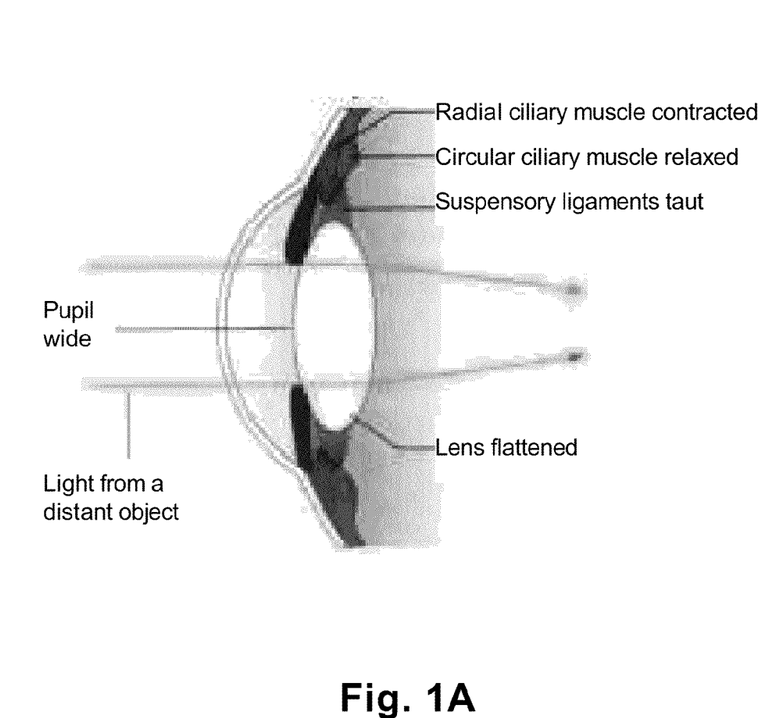
FIGS. 1A and 1B are diagrams of the human eye in far-field and near-field refractive states respectively.
Figure 1B:
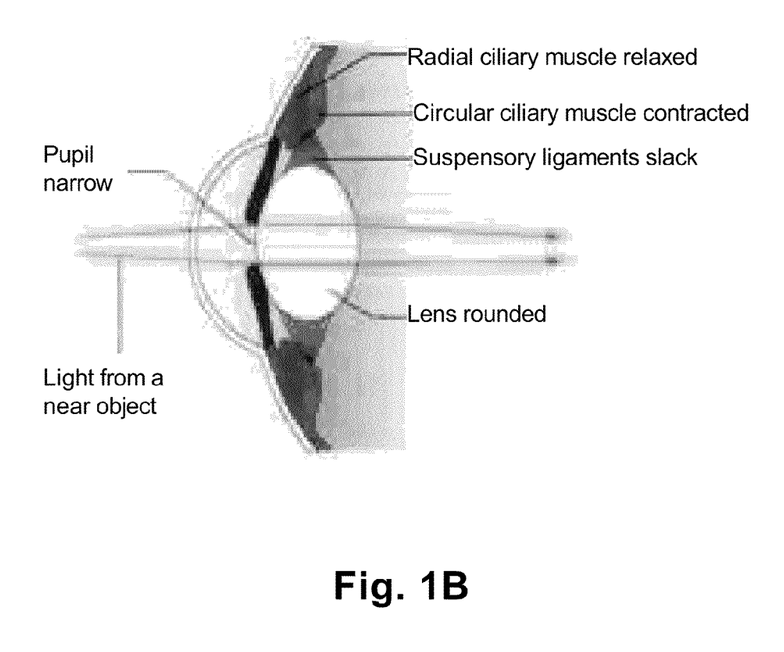

Some aspects of the human visual system are now described. FIGS. 1A and 1B are diagrams of the human eye in far-field and near-field refractive states respectively. In each diagram, light is shown entering the pupil, which is a circular aperture formed by an annular tissue called the iris. The optical system of the eye behaves as a convex lens and produces a reduced inverted image of the visual field on the retina (not shown). A series of refractions occur in the optical system to bring the light rays to a point focus, which in the normal (emmetropic) eye, corresponds to the retina. The focal length f of the eye is given by $$\frac{1}{f} = (l-1)\left(\frac{1}{R_1} - \frac{1}{R_2}\right) \qquad (1)$$

where $R_1$ and $R_2$ are the radii of curvature of the two lens surfaces and l is the refractive index of the lens material (typically 1.34). The radius of curvature of a curved surface is the distance from the point where the surface crosses the optical axis to the center of curvature of the surface. By convention, the radius of curvature $R_1$ of the left (input) surface is positive, and the radius of curvature $R_2$ of the right (output) surface is negative. A series of neurons connect the retina to the brain to convey the information about the visual field.

In FIG. 1A, the eye is shown in a far-field refractive state. The iris is dilated to increase the diameter of the pupil, and the lens is held in a flattened (less convex) shape by contraction of the radial ciliary muscles against the tautened suspensory ligaments. The increase in the two radii of curvature increases the focal length of the eye according to equation (1).

In FIG. 1B, the eye is shown in a near-field refractive state. The iris is contracted to reduce the diameter of the pupil, and the lens is held in a rounded (more convex) shape by contraction of the circular ciliary muscles against the slackened suspensory ligaments. The decrease in the two radii of curvature decreases the focal length of the eye according to equation (1). Contraction of the pupil, i.e. reduction in the aperture of the optical system, reduces the depth of focus of the optical system. The contraction of the pupil is physiologically linked to the "rounding" of the lens because for study of near-field objects, the greatest acuity, i.e. the least amount of aberration, is paramount, and the amount of light entering the eye is of secondary importance. Conversely, for far-field vision, depth of field is of secondary importance next to admitting as much light as possible. In addition, the refractive state of the two eyes is generally approximately the same due to crossover of nerve fibers between the eyes. The refractive state of both eyes can therefore be measured by measuring the diameter of the pupil of either eye.

Any transition between two refractive states of the eye, such as the two states illustrated in FIGS. 1A and 1B, is called accommodation. Accommodation strictly speaking refers only to the change in focal length of the lens, but since pupillary contraction and dilation is physiologically linked to reduction and increase in focal length of the lens respectively, the term accommodation as used herein encompasses both effects. Accommodation is generally an involuntary reflex action, though it can be consciously controlled. The stimulus for involuntary accommodation is the subjective "nearness" of the object centered in the visual field, i.e. where the gaze is directed. "Nearness" is determined by a range of visual cues, including the vergence angle of the two eyes, and blurriness. That is, gazing at a clearly out-of-focus object causes the eyes to accommodate to increase the sharpness of the object. Other "nearness" cues include the perceived size of the object being gazed at. Studies have shown that the brain interprets "small" objects as being "nearer" and therefore causes the eyes to accommodate towards the near field (FIG. 1B) by contracting the pupils and "rounding" the lenses. In other words, the refractive state of the eye is partly dependent on the perceived size of the object being gazed at. It has been shown, for example, that even the act of reading text at a distance of 33 cm causes the eye to accommodate measurably in both the near-field and far-field directions.

The approach to vision-based control of computing devices disclosed herein involves monitoring the refractive state of the eyes of a user via measurements of the diameter of the pupil of one eye while the user is viewing a display of the computing device. The displayed objects are of varying perceived size and therefore have the potential to cause accommodation in the eyes of the user. (Note that although the pupillary diameter can also change in response to changing light levels, it is assumed that this effect is minimal in the environment of a user viewing a nearby display). In addition, the point on the display at which the user's gaze is directed is monitored. If accommodation, i.e. a change in the refractive state, is observed, the parameters of the display, in particular the resolution of a region around the gaze point, are adjusted accordingly. As a result, the display is caused to "zoom in" on a region of the displayed objects around the current gaze point.

Figure 2:
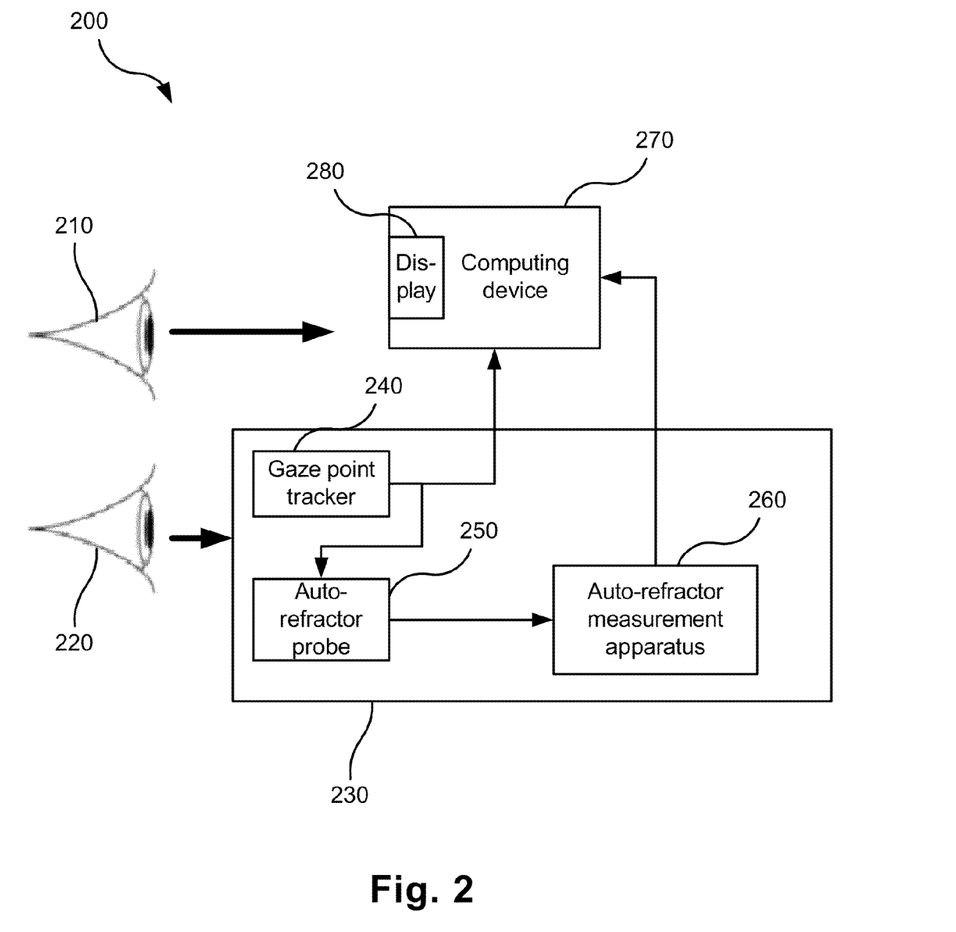
FIG. 2 shows a system for vision-based control of a computing device according to one embodiment.

FIG. 2 shows a system 200 for vision-based control of a computing device according to one embodiment of the invention. The system 200 comprises the two eyes, 210 and 220, of a user (not shown) of a computing device 270 having a display 280. One of the eyes, namely 210, is viewing the display 280 of the computing device 270. The other eye, namely 220, is monitored by a vision monitoring system 230. The vision monitoring system 230 comprises a gaze point tracker 240, an auto-refractor probe 250, and an auto-refractor measurement apparatus 260. The gaze point tracker 240 monitors the eye 220 to identify the point on the display 280 of the computing device 270 at which the user's gaze is directed. The resulting continuous flow of gaze point data controls the position of the auto-refractor probe 250, which in turn monitors the pupil of the eye 220 and provides data indicating the diameter of the pupil to the auto-refractor measurement apparatus 260. The auto-refractor measurement apparatus 260 measures the refractive state of the eye based on the pupil diameter data and provides the resulting continuous flow of refractive-state data to the computing device 270. The computing device 270 processes the refractive-state data from the auto-refractor measurement apparatus 260 and the gaze point data from the gaze point tracker 240 in the manner described below to adjust the visual display of data on the display 280.

Present-day commercial "auto-refractors" comprising an auto-refractor probe 250 and an auto-refractor measurement apparatus 260 are capable of measuring accommodation over a range of at least ±28 D with a precision of 0.02 D or less, where D signifies diopters in units of length$^{-1}$. Commercial gaze point trackers 240 also exist.

Figure 3A:
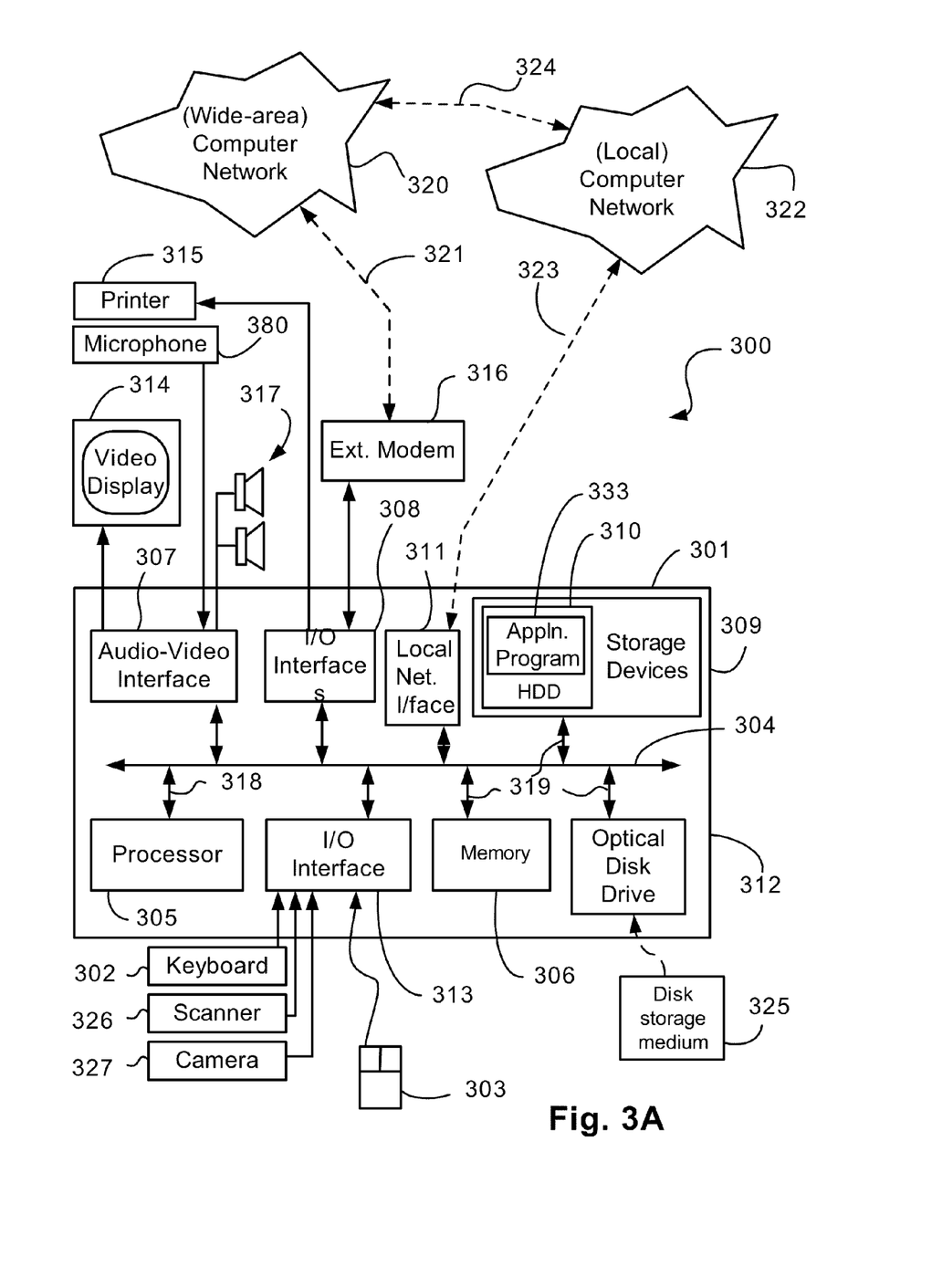
FIGS. 3A and 3B form a schematic block diagram of a general purpose computer system that is an example of the computing device in FIG. 2.
Figure 3B:
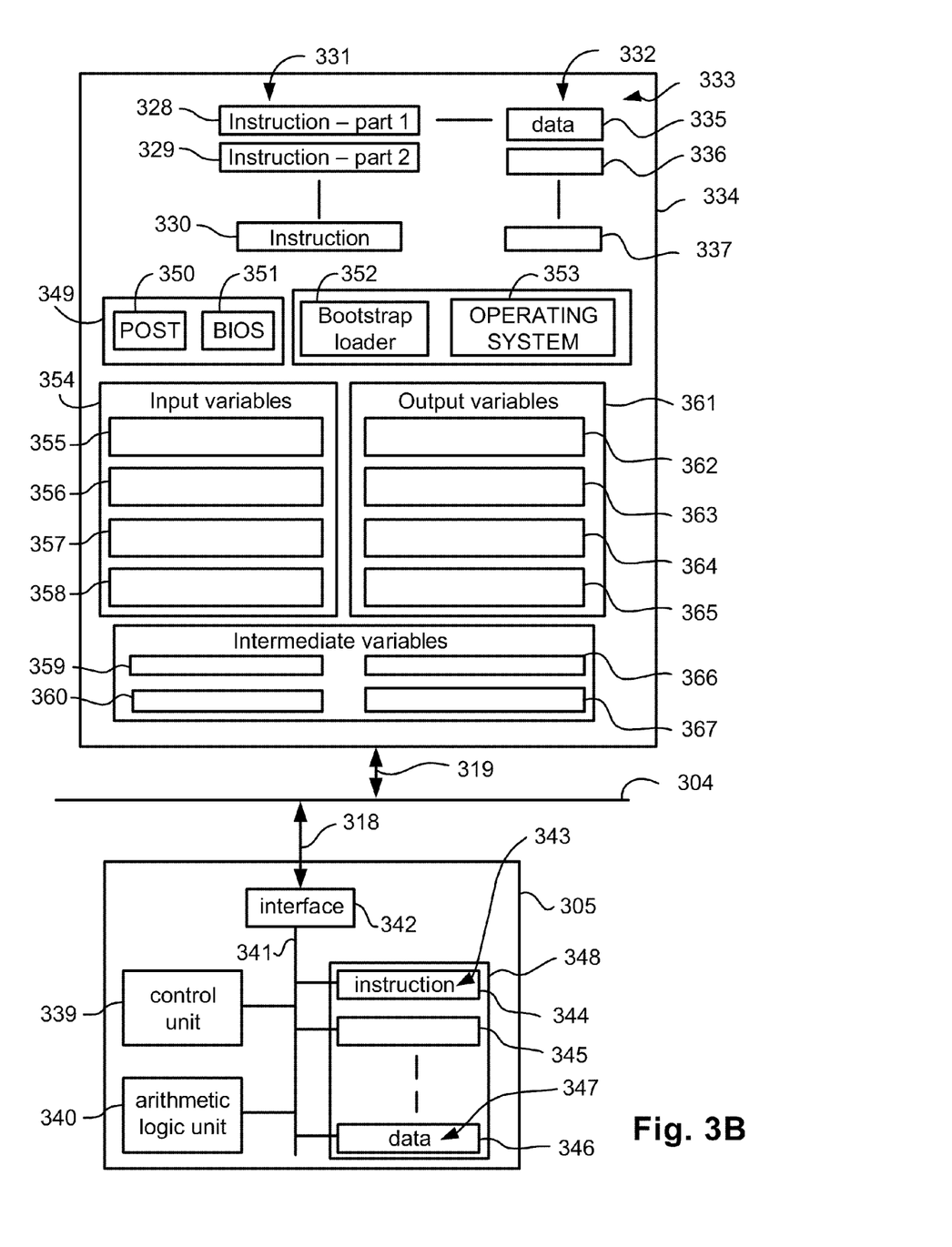

FIGS. 3A and 3B collectively form a schematic block diagram of a general purpose computer system 300 that is an example of a computing device 270 in FIG. 2.

As seen in FIG. 3A, the computer system 300 is formed by a computer module 301, input devices such as a keyboard 302, a mouse pointer device 303, a scanner 326, a camera 327, and a microphone 380, and output devices including a printer 315, a display device 314 (which serves as the display 280) and loudspeakers 317. An external Modulator-Demodulator (Modem) transceiver device 316 may be used by the computer module 301 for communicating to and from a communications network 320 via a connection 321. The network 320 may be a wide-area network (WAN), such as the Internet or a private WAN. Where the connection 321 is a telephone line, the modem 316 may be a traditional "dial-up" modem. Alternatively, where the connection 321 is a high capacity (eg: cable) connection, the modem 316 may be a broadband modem. A wireless modem may also be used for wireless connection to the network 320.

The computer module 301 typically includes at least one processor unit 305, and a memory unit 306 for example formed from semiconductor random access memory (RAM) and semiconductor read only memory (ROM). The module 301 also includes an number of input/output (I/O) interfaces including an audio-video interface 307 that couples to the video display 314, loudspeakers 317 and microphone 380, an I/O interface 313 for the keyboard 302, mouse 303, scanner 326, camera 327 and optionally a joystick (not illustrated), and an interface 308 for the external modem 316 and printer 315. In some implementations, the modem 316 may be incorporated within the computer module 301, for example within the interface 308. The computer module 301 also has a local network interface 311 which, via a connection 323, permits coupling of the computer system 300 to a local computer network 322, known as a Local Area Network (LAN). As also illustrated, the local network 322 may also couple to the wide network 320 via a connection 324, which would typically include a so-called "firewall" device or device of similar functionality. The interface 311 may be formed by an Ethernet circuit card, a Bluetooth™ wireless arrangement or an IEEE 802.11 wireless arrangement.

The interfaces 308 and 313 may afford either or both of serial and parallel connectivity, the former typically being implemented according to the Universal Serial Bus (USB) standards and having corresponding USB connectors (not illustrated). Storage devices 309 are provided and typically include a hard disk drive (HDD) 310. Other storage devices such as a floppy disk drive and a magnetic tape drive (not illustrated) may also be used. An optical disk drive 312 is typically provided to act as a non-volatile source of data.

Portable memory devices, such optical disks (eg: CD-ROM, DVD), USB-RAM, and floppy disks for example may then be used as appropriate sources of data to the system 300.

The components 305 to 313 of the computer module 301 typically communicate via an interconnected bus 304 and in a manner which results in a conventional mode of operation of the computer system 300 known to those in the relevant art. Examples of computers on which the described arrangements can be practised include personal computers and workstations controlled by any of several commercially-available operating systems.

Figure 4:
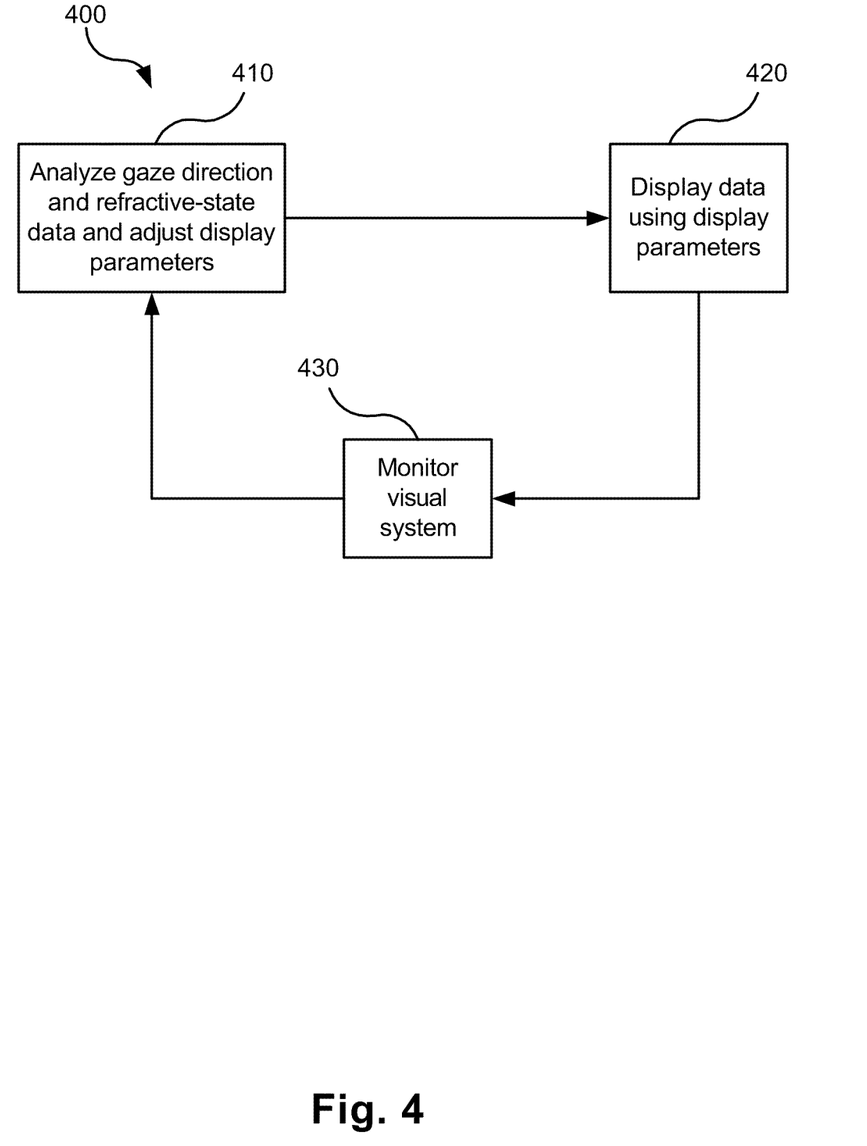
FIG. 4 is a flow chart showing the control loop of the vision-based control system of FIG. 2.
Figure 5:
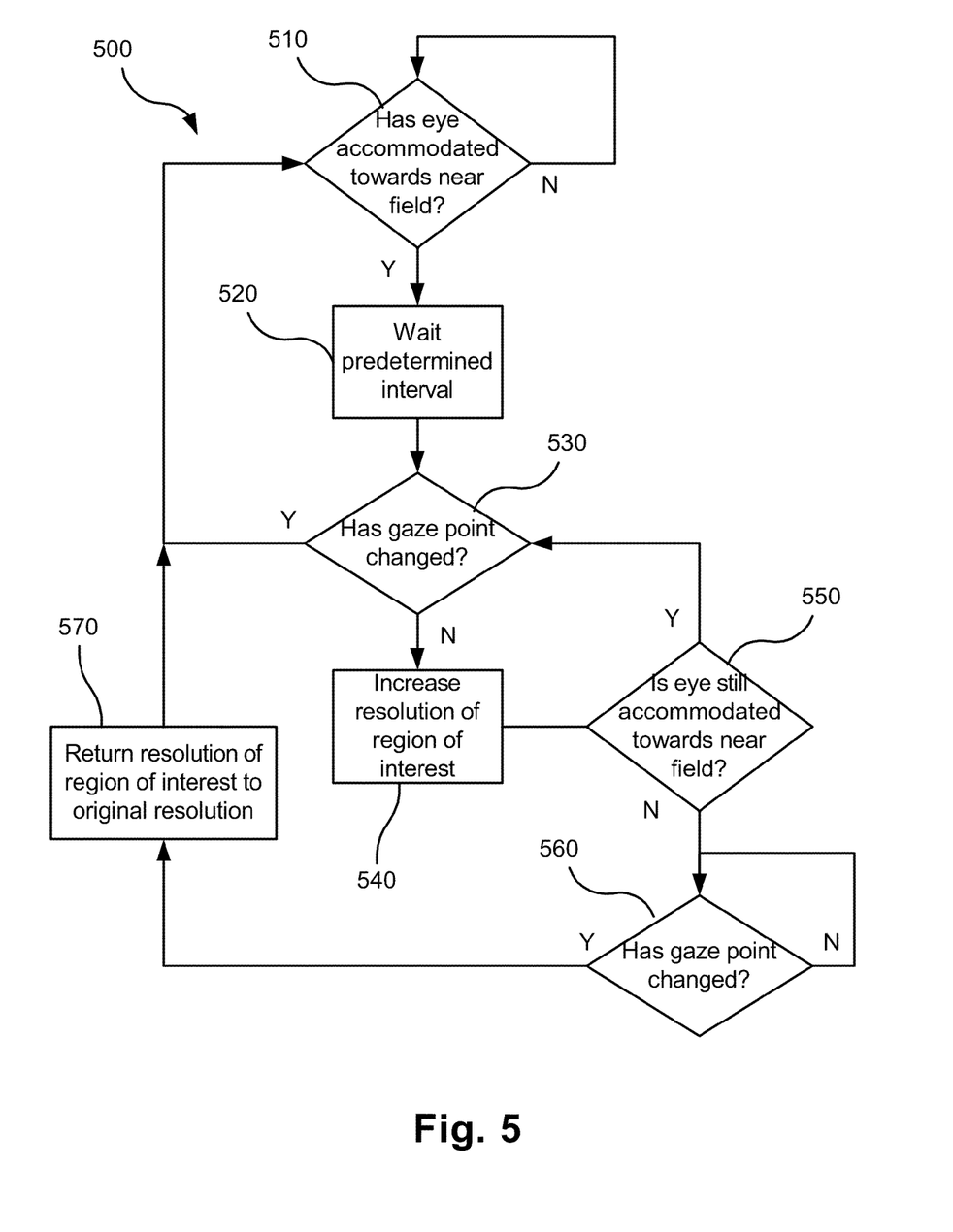
FIG. 5 is a flow chart illustrating a method that may be used to implement the analyze-and-adjust process of FIG. 4.

The processes and methods of FIGS. 4 and 5, to be described, may be implemented as one or more software application programs 333 executable within the computer system 300. In particular, the steps of the methods of FIGS. 4 and 5 are effected by instructions 331 in the software 333 that are carried out within the computer system 300. The software instructions 331 may be formed as one or more code modules, each for performing one or more particular tasks.

The software 333 is generally loaded into the computer system 300 from a computer readable medium, and is then typically stored in the HDD 310, as illustrated in FIG. 3A, or the memory 306, after which the software 333 can be executed by the computer system 300. In some instances, the application programs 333 may be supplied to the user encoded on one or more CD-ROM 325 and read via the corresponding drive 312 prior to storage in the memory 310 or 306. Alternatively the software 333 may be read by the computer system 300 from the networks 320 or 322 or loaded into the computer system 300 from other computer readable media. Computer readable storage media refers to any storage medium that participates in providing instructions and/or data to the computer system 300 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 301. Examples of computer readable transmission media that may also participate in the provision of software, application programs, instructions and/or data to the computer module 301 include radio or infra-red transmission channels as well as a network connection to another computer or networked device, and the Internet or Intranets including e-mail transmissions and information recorded on Websites and the like.

The second part of the application programs 333 and the corresponding code modules mentioned above may be executed to implement one or more graphical user interfaces (GUIs) to be rendered or otherwise represented upon the display 314. Through manipulation of typically the keyboard 302 and the mouse 303, a user of the computer system 300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 317 and user voice commands input via the microphone 380.

FIG. 3B is a detailed schematic block diagram of the processor 305 and a "memory" 334. The memory 334 represents a logical aggregation of all the memory devices (including the HDD 310 and semiconductor memory 306) that can be accessed by the computer module 301 in FIG. 3A.

When the computer module 301 is initially powered up, a power-on self-test (POST) program 350 executes. The POST program 350 is typically stored in a ROM 349 of the semiconductor memory 306. A program permanently stored in a hardware device such as the ROM 349 is sometimes referred to as firmware. The POST program 350 examines hardware within the computer module 301 to ensure proper functioning, and typically checks the processor 305, the memory (309, 306), and a basic input-output systems software (BIOS) module 351, also typically stored in the ROM 349, for correct operation. Once the POST program 350 has run successfully, the BIOS 351 activates the hard disk drive 310. Activation of the hard disk drive 310 causes a bootstrap loader program 352 that is resident on the hard disk drive 310 to execute via the processor 305. This loads an operating system 353 into the RAM memory 306 upon which the operating system 353 commences operation. The operating system 353 is a system level application, executable by the processor 305, to fulfill various high level functions, including processor management, memory management, device management, storage management, software application interface, and generic user interface.

The operating system 353 manages the memory (309, 306) in order to ensure that each process or application running on the computer module 301 has sufficient memory in which to execute without colliding with memory allocated to another process. Furthermore, the different types of memory available in the system 300 must be used properly so that each process can run effectively. Accordingly, the aggregated memory 334 is not intended to illustrate how particular segments of memory are allocated (unless otherwise stated), but rather to provide a general view of the memory accessible by the computer system 300 and how such is used.

The processor 305 includes a number of functional modules including a control unit 339, an arithmetic logic unit (ALU) 340, and a local or internal memory 348, sometimes called a cache memory. The cache memory 348 typically includes a number of storage registers 344-346 in a register section. One or more internal buses 341 functionally interconnect these functional modules. The processor 305 typically also has one or more interfaces 342 for communicating with external devices via the system bus 304, using a connection 318.

The application program 333 includes a sequence of instructions 331 that may include conditional branch and loop instructions. The program 333 may also include data 332 which is used in execution of the program 333. The instructions 331 and the data 332 are stored in memory locations 328-330 and 335-337 respectively. Depending upon the relative size of the instructions 331 and the memory locations 328-330, a particular instruction may be stored in a single memory location as depicted by the instruction shown in the memory location 330. Alternately, an instruction may be segmented into a number of parts each of which is stored in a separate memory location, as depicted by the instruction segments shown in the memory locations 328-329.

In general, the processor 305 is given a set of instructions which are executed therein. The processor 305 then waits for a subsequent input, to which it reacts to by executing another set of instructions. Each input may be provided from one or more of a number of sources, including data generated by one or more of the input devices 302, 303, data received from an external source across one of the networks 320, 322, data retrieved from one of the storage devices 306, 309 or data retrieved from a storage medium 325 inserted into the corresponding reader 312. The execution of a set of the instructions may in some cases result in output of data. Execution may also involve storing data or variables to the memory 334.

The disclosed vision-based control methods use input variables 354, that are stored in the memory 334 in corresponding memory locations 355-358. The methods produce output variables 361, that are stored in the memory 334 in corresponding memory locations 362-365. Intermediate variables may be stored in memory locations 359, 360, 366 and 367.

The register section 344-346, the arithmetic logic unit (ALU) 340, and the control unit 339 of the processor 305 work together to perform sequences of micro-operations needed to perform "fetch, decode, and execute" cycles for every instruction in the instruction set making up the program 333. Each fetch, decode, and execute cycle comprises:

(a) a fetch operation, which fetches or reads an instruction 331 from a memory location 328;

(b) a decode operation in which the control unit 339 determines which instruction has been fetched; and (c) an execute operation in which the control unit 339 and/or the ALU 340 execute the instruction.

Thereafter, a further fetch, decode, and execute cycle for the next instruction may be executed. Similarly, a store cycle may be performed by which the control unit 339 stores or writes a value to a memory location 332.

Each step or sub-process in the processes and methods of FIGS. 4 and 5 is associated with one or more segments of the program 333, and is performed by the register section 344-347, the ALU 340, and the control unit 339 in the processor 305 working together to perform the fetch, decode, and execute cycles for every instruction in the instruction set for the noted segments of the program 333.

The processes and methods of FIGS. 4 and 5 may alternatively be implemented in dedicated hardware such as one or more integrated circuits performing the functions or sub functions of FIGS. 4 and 5. Such dedicated hardware may include graphic processors, digital signal processors, or one or more microprocessors and associated memories.

FIG. 4 is a flow chart showing a control process 400 of the vision-based control system 200 of FIG. 2. The subprocesses 410 and 420 in the control process 400 are implemented as software in the computing device 270 of FIG. 2 as described above, while the subprocess 430 is carried out by the vision monitoring system 230 of FIG. 2.

The control process 400 is invoked when a data set, e.g. an image or a portion thereof, is being displayed in a portion of the display 280 at an original resolution that has been set by the user or the computing device 270 in a separate subprocess (not shown).

In the subprocess 430, the vision monitoring system 230 monitors the visual system of the user in the manner described above with reference to FIG. 2, and provides gaze point data and refractive-state data to the computing device 270. The gaze point data is in screen coordinates, while the refractive-state data is in units of diopters. Positive values indicate accommodation for near-field vision (i.e. positive accommodation) and negative values indicate accommodation for far-field vision (i.e. negative accommodation).

In the subprocess 410, the computing device 270 analyzes the gaze point and refractive-state data received from the vision monitoring system 230 and adjusts the parameters of the display of data on the display 280 of the computing device 270 in the manner to be described below. In the subprocess 420, the computing device 270 displays the data according to the display parameters received from the subprocess 410. The display parameters are the screen coordinates of a center point and the resolution of a "region of interest" dependent on the center point. The resolution is defined as a multiple of the original resolution. The region of interest is centered on the center point and may be of predetermined shape, e.g. rectangular, and of predetermined size smaller than the size of the portion of the display 280 occupied by the data set being displayed, or may be equal in size to the portion of the display 280 occupied by the data set being displayed. Given these display parameters, the display subprocess 420 is carried out in a manner well known to one of ordinary skill in the art of computer graphics and will not be further described herein.

The adjustment of the display parameters causes the eyes of the user viewing the display to respond accordingly, a response which will be observed by the vision monitoring system 230. The display of data therefore tracks the response of the eyes of the user viewing the data in closed-loop fashion, as illustrated in FIG. 4.

FIG. 5 is a flow chart showing a method 500 that may be used to implement the analyze-and-adjust subprocess 410 of the control process 400 of FIG. 4 carried out by the computing device 270 of FIG. 2. The method 500 starts at step 510 where the computing device 270 enters a loop to determine whether the refractive-state data indicates that the eye 220 has accommodated toward a "near-field" refractive state, presumably by the user directing their gaze at a "small" object on the display 280. If there is no accommodation toward a "near-field" refractive state, the method 500 remains at step 510. If the computing device 270 detects accommodation toward a "near-field" refractive state, the method 500 at step 520 waits for a predetermined interval before, at step 530, determining from the gaze point data whether the user's gaze point has changed since the accommodation detected at step 510. If the user's gaze point has changed, the method 500 returns to the loop 510 to look for near-field accommodation once again.

If the user's gaze point has not changed since the accommodation detected at step 510, the method 500 proceeds to step 540 where the computing device 270 sets the center point to be the current gaze point and increases the resolution parameter by an amount that is proportional to the amount of accommodation detected at step 510, thereby (through subprocess 420) magnifying a region of interest centered on, i.e. "zooming in" on the gaze point as displayed on the display 280. This action will increase the perceived size of the object being gazed at, and therefore reduce the amount of accommodation. At the following step 550, the computing device 270 determines whether the eye 220 is still accommodated toward a "near-field" refractive state relative to the starting point of the change detected at step 510. If so, the method 500 returns to step 530 to determine whether the user's gaze point has changed since the accommodation detected at step 510. If at step 550 the computing device 270 determines that the eye 220 is no longer accommodated toward a "near-field" refractive state, presumably because the object being viewed is at a comfortable size, the method 500 proceeds to step 560 where the computing device 270 enters a loop looking for a change in the user's gaze point. If no change is detected, the method 500 remains at step 560. Once a change in gaze point is detected, the method 500 proceeds to step 570 where the computing device 270 starts to decrease the resolution of the magnified region of interest at a predetermined rate such that that region returns to its original resolution on the display 280. The method 500 then returns to the loop 510 to look for near-field accommodation once again.

The computing device 270 may also employ a further method as part of the analyze-and-adjust subprocess 410 that is of particular utility when the data set being displayed on the display 280 is a portion of a larger data set such as an image. According to the further method, the computing device 270 determines whether the user's gaze point has departed from the portion of the display 280 in which the data set is being displayed. After a predetermined delay, the computing device 270 adjusts the display parameters to "scroll" the display of the image portion in the direction of the gaze point in conventional fashion, until the user's gaze is once again determined to be within the portion of the display 280 in which the data set is being displayed, when the "scrolling" halts.

As a further alternative, the control loop 400 of FIG. 4 could be ended in favor of manual control of the computing device 270 if the refractive-state data indicates that the user's eye has accommodated to a far-field refractive state, as a result of the user looking away from the screen entirely.

The foregoing describes only some embodiments of the invention, and modifications and/or changes can be made thereto without departing from the scope and spirit of the invention, the embodiments being illustrative and not restrictive.

The invention claimed is:

1. A system for controlling a computing device having a display, the system comprising:
    a vision monitoring system comprising:
    an auto-refractor measurement apparatus adapted to provide data indicating a refractive state of an eye of a user of the computing device; and
    a gaze point tracker adapted to provide data indicating a point on the display at which the user's gaze is directed; and
    a control process adapted to be executed by a processor of the computing device, the control process comprising:
    an analyze-and-adjust subprocess adapted to:
    analyze the gaze point data and the refractive-state data; and
    adjust one or more display parameters dependent on the analysis.

2. The system of claim 1, wherein the vision monitoring system further comprises an auto-refractor probe adapted to provide data indicating the diameter of the pupil of the eye to the auto-refractor measurement apparatus.

3. The system of claim 2, wherein the auto-refractor probe uses the gaze point data provided by the gaze point tracker.

4. The system of claim 1, wherein the analysis of the refractive-state data comprises determining whether the eye of the user has accommodated toward a near-field refractive state.

5. The system of claim 1, wherein the adjustment of the display parameters comprises increasing the resolution of a region on the display centered on the gaze point.

6. A computer readable storage medium having a computer program recorded thereon for controlling a computing device having a display, said computer program comprising:
    computer program code for identifying a point on the display at which the gaze of a user of the computing device is directed;
    computer program code for determining whether an eye of the user has accommodated toward a near-field refractive state; and
    computer program code for adjusting, based on the determining, one or more display parameters of a region on the display, the region including the identified gaze point.

7. The computer readable storage medium of claim 6, wherein the computer program code for determining whether an eye of a user has accommodated toward a near-field refractive state comprises computer program code for measuring the diameter of the pupil of the eye.

* * * * *